(12) United States Patent
Kim et al.

(10) Patent No.: US 12,246,672 B2
(45) Date of Patent: Mar. 11, 2025

(54) SEAT BELT RETRACTOR (71) Applicant: Autoliv Development AB, Vargarda (SE)

(72) Inventors: Jung Han Kim, Hwaseong-si (KR); Chan Ki Moon, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/261,955

(22) PCT Filed: Dec. 9, 2021

(86) PCT No.: PCT/KR2021/018592
§ 371 (c)(1),
(2) Date: Aug. 16, 2023

(87) PCT Pub. No.: WO2022/158711
PCT Pub. Date: Jul. 28, 2022

(65) Prior Publication Data
US 2024/0083383 A1    Mar. 14, 2024

(30) Foreign Application Priority Data

Jan. 22, 2021 (KR) .................. 10-2021-0009745
Sep. 30, 2021 (KR) .................. 10-2021-0130264
Nov. 25, 2021 (KR) .................. 10-2021-0164627

(51) Int. Cl.
*B60R 21/013* (2006.01)
*B60R 21/0134* (2006.01)
*B60R 21/0136* (2006.01)
*B60R 22/18* (2006.01)
(Continued)

(52) U.S. Cl.
CPC ...... *B60R 22/1951* (2013.01); *B60R 21/0134* (2013.01); *B60R 21/0136* (2013.01);
(Continued)

(58) Field of Classification Search
CPC ............ B60R 21/0134; B60R 21/0136; B60R 2021/01306; B60R 22/1951; B60R 22/18;
(Continued)

(56) References Cited

U.S. PATENT DOCUMENTS 5,971,491 A * 10/1999 Fourrey ................. B60R 22/26
                                                                297/484
6,443,382 B1     9/2002 Bae
(Continued)

FOREIGN PATENT DOCUMENTS

JP     1997-193742 A    7/1997
JP     2009-096233 A    5/2009
(Continued)

OTHER PUBLICATIONS

Korean Written Opinion from Global Dossier. (Year: 2023).*

*Primary Examiner* — Jason D Shanske
*Assistant Examiner* — Daniel M. Keck
(74) *Attorney, Agent, or Firm* — DICKINSON WRIGHT PLLC (57) ABSTRACT

A seat belt retractor which is mounted in a mounting space formed on a backrest of a seat installed in a vehicle and comprises a spindle module including webbing and a spindle having the webbing wound on the outer surface thereof, wherein the spindle is arranged along the longitudinal direction of the vehicle corresponding to the thickness direction of the backrest in the mounting space, such that by rotating the direction in which the spindle, on which the webbing is wound, is installed, the width in the longitudinal direction mounted on the backrest of the seat can be minimized, thereby making the retractor more slender.

10 Claims, 9 Drawing Sheets

(51) Int. Cl.
  *B60R 22/195*  (2006.01)
  *B60R 22/26*   (2006.01)
  *B60R 22/34*   (2006.01)
  *B60R 22/46*   (2006.01)
(52) U.S. Cl.
  CPC .......... *B60R 22/26* (2013.01); *B60R 22/4604* (2013.01); *B60R 2021/01306* (2013.01); *B60R 2022/1818* (2013.01); *B60R 22/4628* (2013.01)
(58) Field of Classification Search
  CPC ..... B60R 22/1818; B60R 22/26; B60R 22/34; B60R 22/4604; B60R 22/4628; B60R 2022/3402
  See application file for complete search history.

(56) References Cited

U.S. PATENT DOCUMENTS

| | | | |
|---|---|---|---|
| 6,499,554 | B1 | 12/2002 | Yano et al. |
| 6,769,716 | B2 * | 8/2004 | Rouhana ................ B60R 22/02 |
| | | | 297/480 |
| 8,479,863 | B2 * | 7/2013 | Adolfsson ............... B60R 22/18 |
| | | | 297/483 |
| 9,302,645 | B1 | 4/2016 | Shenaq et al. |
| 2009/0309345 | A1 | 12/2009 | Specht |
| 2014/0312677 | A1 | 10/2014 | Bostrom et al. |
| 2020/0047710 | A1 * | 2/2020 | Jabusch .............. B60R 22/4604 |
| 2023/0202423 | A1 * | 6/2023 | Kini .................... B60R 22/1958 |
| | | | 280/806 |

FOREIGN PATENT DOCUMENTS

| | | |
|---|---|---|
| JP | 2011-016480 A | 1/2011 |
| JP | 2011-116296 A | 6/2011 |
| JP | 2011-131697 A | 7/2011 |
| JP | 6560888 B2 | 8/2019 |
| JP | 6768829 B2 | 9/2020 |
| KR | 10-2001-0048537 A | 6/2001 |
| KR | 10-2013-0119682 A | 11/2013 |
| KR | 10-2020-0106973 A | 9/2020 |
| KR | 10-1766844 | 9/2020 |

* cited by examiner

- PRIOR ART -

SEAT BELT RETRACTOR

CROSS-REFERENCE TO RELATED APPLICATIONS

This application is a 35 U.S.C. § 371 national phase of PCT International Application No. PCT/KR2021/018592, filed Dec. 9, 2021, which claims the benefit of priority under 35 U.S.C. § 119 to KR 10-2021-0009745, filed Jan. 22, 2021, KR 10-2021-0130264, filed Sep. 30, 2021, and KR 10-2021-0164627, filed Nov. 25, 2021, the contents of which are incorporated herein by reference in its entirety.

TECHNICAL FIELD

The disclosure relates to a seat belt retractor, and more particularly, to a seat belt retractor which prevents a seat belt from being released upon a vehicle collision.

BACKGROUND ART

In general, a vehicle is equipped with a seat belt safety device in a seat to ensure the safety of an occupant.

The seat belt safety device includes a retractor which operates to allow a band-shaped seat belt webbing (hereinafter, referred to as a "webbing") for fixing an occupant to be wound on a spool, or to be pulled out, and a buckle into which a tongue fixed at one end of the webbing is removably inserted.

The retractor prevents an occupant wearing the seat belt from being bounced forward or moved away from a seat due to driving inertia when the vehicle suddenly stops or accelerates due to a vehicle accident. Such a retractor may include a device that allows the webbing to be pulled out in a normal state when the occupant wears the seat belt, but, when a change in the pull-out acceleration of the webbing or the inclination of the vehicle is detected due to a vehicle collision, prevents the webbing from being further pulled out, and an emergency tensioning device and a pretensioning device that reduce looseness or hanging of the webbing, that is, slack of the webbing.

For example, in Patent Document 1 and Patent Document 2 below, a retractor technique for controlling winding and unwinding operations of a seat belt webbing is disclosed.

Meanwhile, when an acceleration exceeding a predetermined value is applied to the seat belt retractor in the horizontal direction, or the inclination of the vehicle is changed, such as when the vehicle collision occurs, a vehicle sensor that detects the acceleration or the inclination is applied to prevent the webbing from being pulled out by operating a locking device of the seat belt.

A vehicle sensor using a ball as an inertial member or an independent inertial member is generally known in the art.

For example, the vehicle sensor includes an inertial member that moves in a dangerous situation where a deceleration higher than a normal deceleration of the webbing or an inclination is applied to the vehicle, and a sensor lever that interworks with external teeth of a control disc which is moved by the inertia member and rotates together with a spool of the seat belt retractor.

Such a seat belt retractor may be mounted in a vehicle body, for example, a center pillar of the vehicle, a backrest of a seat, a rear pillar, etc. Accordingly, a mounting posture of the seat belt retractor may be variously changed according to a structure of the center pillar, the backrest of the seat, the rear pillar, etc. That is, the seat belt retractor is not always mounted in the horizontal state, and may be mounted in a state in which it is inclined from the horizontal state by a predetermined angle in a left-right direction or a front-rear direction.

In particular, when the seat belt retractor is installed in the backrest of the seat, the inclination of the seat belt retractor may be changed according to rotation of the backrest.

However, if the posture of the related-art seat belt retractor is changed over a certain range, the acceleration and the inclination cannot be properly detected.

For example, when the retractor having the vehicle sensor has a posture that is inclined over a certain range from the horizontal state, a distance between the control disc and the sensor lever of the vehicle sensor becomes too close, so the sensor lever operates sensitively, so that the locking operation cannot be properly performed.

In addition, when the retractor having the vehicle sensor is mounted in the backrest of the seat, and the backrest of the seat is inclined toward the front side of the vehicle, the sensor lever of the vehicle sensor is caught by the external teeth of the control disc, thereby restricting the rotation of the spool.

For this reason, when an occupant wants to wear the seat belt, it may not be possible to wear the seat belt because the rotation of the spool is restricted.

In order to solve the above problems, the applicant of the present invention has filed a patent application that discloses a seat belt retractor configuration having a vehicle sensor with an improved fixing structure in Patent Document 3 below, which is now registered.

Meanwhile, as autonomous vehicles are developing recently, a technology for minimizing volumes of a seat applied to a vehicle and a seat belt retractor is developing. In particular, a seat becomes slimmer by designing a backrest to have a thin thickness.

In a related-art seat belt retractor, a rotation shaft of a spindle on which a webbing is wound is disposed in the same direction as a rotation shaft of a backrest, and accordingly, a total volume increases according to how many times the webbing is wound on the spindle, and there is a limit to reducing a width of the seat belt retractor corresponding to the backrest in the front-rear direction.

In addition, the related-art seat belt retractor is configured by assembling a plurality of components, and accordingly, the structure thereof is complicated. When any one individual component breaks down or is damaged, there is a problem that the whole retractor should be replaced since only the corresponding component cannot be repaired.

(Patent Document 1) U.S. Pat. No. 6,499,554 (registered on Dec. 31, 2002)
(Patent Document 2) U.S. Pat. No. 6,443,382 (registered on Sep. 3, 2002)
(Patent Document 3) Korean Patent Registration No. 10-1766844 (issued Aug. 9, 2017)

SUMMARY

An object of the present disclosure is to solve the above-described problems, and is to provide a seat belt retractor which safely protects an occupant by fixing the occupant upon a vehicle collision.

Another object of the present disclosure is to provide a seat belt retractor which is applied to a seat that is fabricated to be slim by reducing a thickness of a backrest.

Still another object of the present disclosure is to provide a seat belt retractor which is fabricated by modulizing respective components according to function blocks, and selectively combining the respective modules.

To achieve the above-described objects, a seat belt retractor according to the disclosure is mounted in a mounting space formed in a backrest of a seat installed in a vehicle, and the seat belt retractor includes a spindle module including a webbing and a spindle having an outer surface on which the webbing is wound, and the spindle is disposed in the mounting space along a front-rear direction of the vehicle corresponding to a thickness direction of the backrest.

According to the disclosure as described above, there is an effect of making the seat belt retractor slim by rotating a direction in which the spindle on which the webbing is wound is installed and minimizing a width of the seat belt retractor mounted in the backrest of the seat in the front-rear direction.

That is, according to the disclosure, there are effects of designing the backrest to have a thin thickness by changing an arrangement direction of the spindle on which the webbing is wound, and of minimizing a mounting space necessary when the seat belt retractor is applied to a slim seat.

In addition, according to the disclosure, there is an effect of fabricating by modulizing respective components applied to the seat belt retractor according to function blocks, and selectively combining modules corresponding to necessary functions.

Accordingly, according to the disclosure, it is possible to apply the seat belt retractor to a slim seat which is being developed recently, and there is an effect of implementing an integrated seat belt that is integrated into a seat.

In addition, according to the disclosure, there is an effect of freely adjusting a pull-out direction and a pull-out angle of the webbing wound on the spindle.

Accordingly, according to the disclosure, there is an effect of enhancing safety by adjusting the pull-out direction and angle of the webbing according to a physical condition of an occupant or a purpose of use.

DETAILED DESCRIPTION

Hereinafter, a seat belt retractor according to preferred embodiments of the disclosure will be described in detail with reference to the accompanying drawings.

Prior to explaining a configuration of the seat belt retractor according to preferred embodiments of the disclosure, a configuration of a seat belt retractor according to related-art technology will be roughly explained with reference to FIG. 1.

Figure 1:
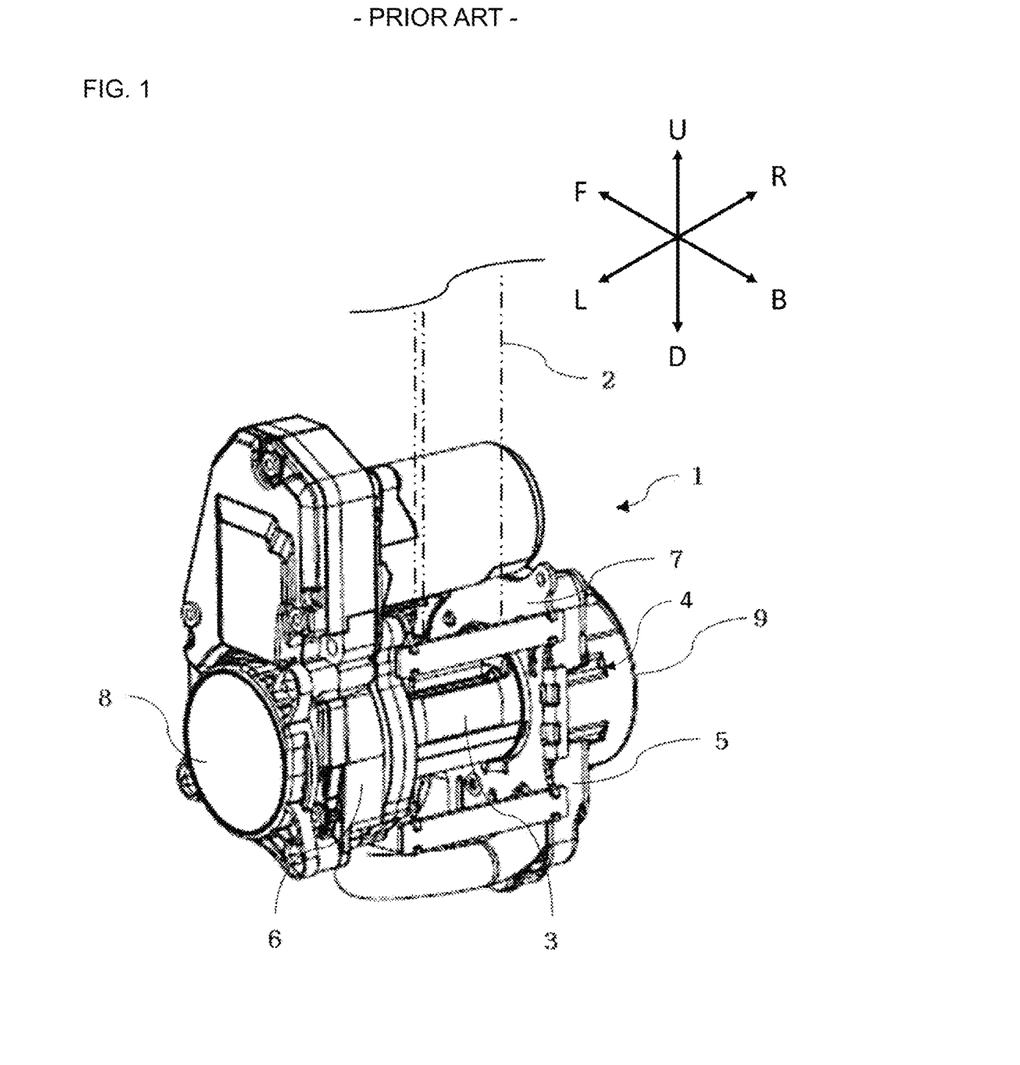
FIG. 1 is a view illustrating an example of a related-art seat belt retractor.

FIG. 1 is a view illustrating an example of a related-art seat belt retractor.

Hereinafter, a direction toward a steering wheel from a seat of a vehicle is referred to as a 'forward direction (F),' and the opposite direction thereof is referred to as a 'backward direction (B).' In addition, terms indicating directions such as 'left side (L),' 'right side (R),' 'upward direction (U),' and 'downward direction (D)' are defined to indicate respective directions with reference to the forward direction (F) and the backward direction (B) described above.

As shown in FIG. 1, the related-art seat belt retractor 1 may include a spindle 3 on which a seat belt webbing (hereinafter, referred to as a 'webbing') 2 is wound, a sensor unit 4 that detects an inclination of the vehicle, an emergency tensioning unit 5 that reduces slack by winding the webbing 2 upon a vehicle collision, and a pretensioning unit 6 that smoothly pulls out the webbing 2 during normal driving of the vehicle and reduces slack by winding the webbing 2 just before a vehicle collision.

The sensor unit 4 detects a change in the pull-out acceleration of the webbing or a change in the inclination of the vehicle caused by a vehicle collision.

The emergency tensioning unit 5 may operate an inflater (not shown) having gunpowder embedded therein according to a detection signal that detects a vehicle collision, and may wind the webbing 2 on the spindle 3 by using a pressure of a generated gas. Accordingly, the emergency tensioning unit 5 may reduce an injury value of a passenger by reducing slack of the webbing 2 by winding the webbing 2 upon a vehicle collision.

When a vehicle collision is predicted through a sensor applied to the vehicle, the pretensioning unit 6 may wind the webbing 2 on the spindle 3 by operating a motor which is capable of rotation and reverse rotation. That is, when the vehicle travels normally, the pretensioning unit 6 may keep the tension of the worn webbing 2 and prevent the webbing 2 from being loosened until a stronger acceleration or deceleration of the vehicle occurs even if there is no accident, and may reduce an injury value of a passenger by reducing slack of the webbing 2 by winding the webbing 2 just before a vehicle collision.

Herein, the spindle 3 is installed inside a fixing frame 7, and the sensor unit 4, the emergency tensioning unit 5, and the pretensioning unit 6 are disposed on both sides of the fixing frame 7, and left and right housings 8, 9 are coupled to the outside of each unit.

That is, the respective units 4, 5, 6 are disposed on both sides of the spindle 2 along a traverse direction.

As described above, the related-art seat belt retractor 1 is fabricated by coupling the respective components such as the spindle 3, the sensor unit 4, the emergency tensioning unit 5, the pretensioning unit 6 to one another in a complicated structure.

Accordingly, in the related-art seat belt retractor 1, the spindle 3 is installed between both sidewalls of the fixing frame, and the webbing 2 has one side that is wound on the outer surface of the spindle 3 and the other side that is pulled out in the upward direction.

In addition, in the related-art seat belt retractor 1, the spindle 3 is installed between both sidewalls of the fixing frame, and the webbing 2 has one side that is wound on the outer surface of the spindle 3 and the other side that is pulled out in the upward direction.

Accordingly, as the length of the webbing 2 wound on the spindle 3 increases, the volume of the related-art seat belt retractor 1 in the front-rear direction inevitably increases.

Recently, a seat installed in a vehicle is fabricated to be slim by designing a thickness of a backrest in the front-rear direction (hereinafter, referred to as a 'thickness') to be thin. In addition, an integrated seat belt (Belt In Seat (BIS)) may be applied to be integrated into the seat.

In particular, a seat applied to an autonomous vehicle is being developed to be rotatable in the left-right direction and to rotate a backrest backward up to a maximum angle of 180°.

As described above, in order to install the seat belt retractor 1 in the slim seat, the width of the seat belt retractor 1 in the front-rear direction that is mounted in the seat, particularly, the backrest, should be minimized.

However, in the related-art seat belt retractor 1, the spindle 3 is mounted to face the same direction as a rotation shaft of the backrest while being installed between both side walls of the fixing frame 7.

To this end, the width of the related-art seat belt retractor 1 in the front-rear direction increases according to a length of the webbing 2 wound on the outer surface, and accordingly, there is a problem that it is difficult to apply the related-art seat belt retractor 1 to a backrest of a slim seat.

To solve this problem, the disclosure modulizes respective components applied to a seat belt retractor according to function blocks, and fabricates the seat belt retractor by selectively combining modules corresponding to necessary functions.

In addition, the disclosure makes the seat belt retractor slim by minimizing a width of the seat belt retractor in a front-rear direction by changing a direction in which a spindle on which a webbing is wound is installed.

Hereinafter, a configuration of a seat belt retractor according to a preferred embodiment of the disclosure will be described in detail with reference to FIGS. 2 to 5.

Figure 2:
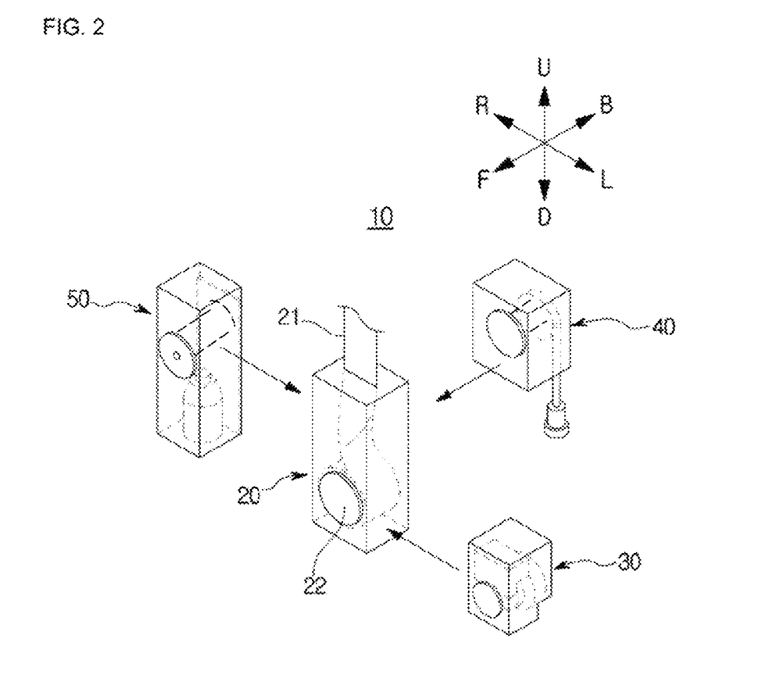
FIG. 2 is an exploded perspective view of a seat belt retractor according to a preferred embodiment of the disclosure.
Figure 3:
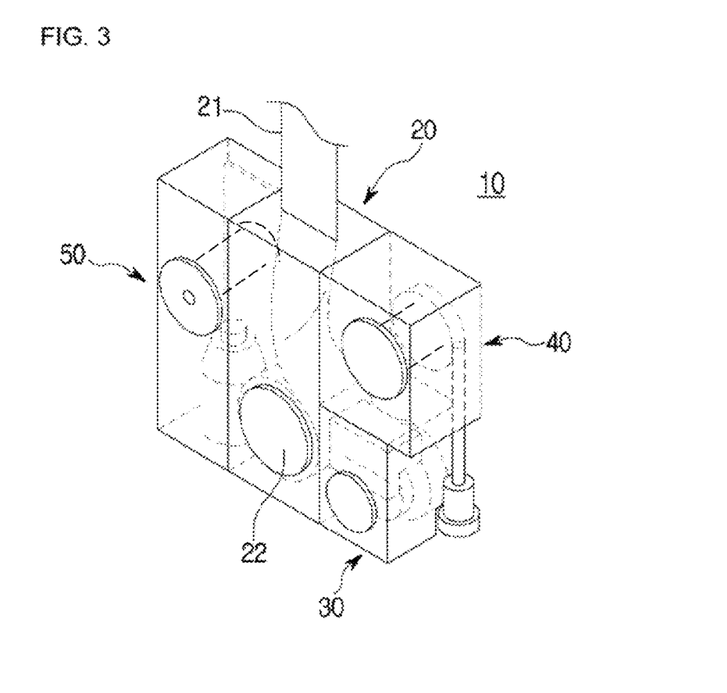
FIG. 3 is a perspective view illustrating a state in which respective modules shown in FIG. 2 are assembled.
Figure 4:
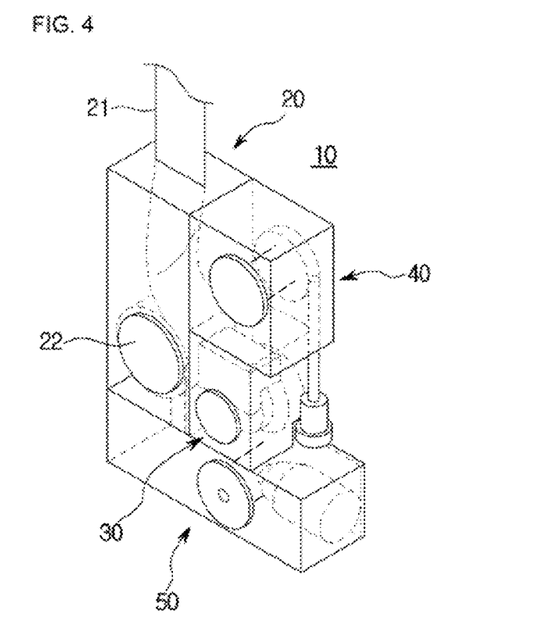
FIGS. 4 and 5 are views illustrating states in which the respective modules shown in FIG. 2 are assembled in different methods, respectively.
Figure 5:
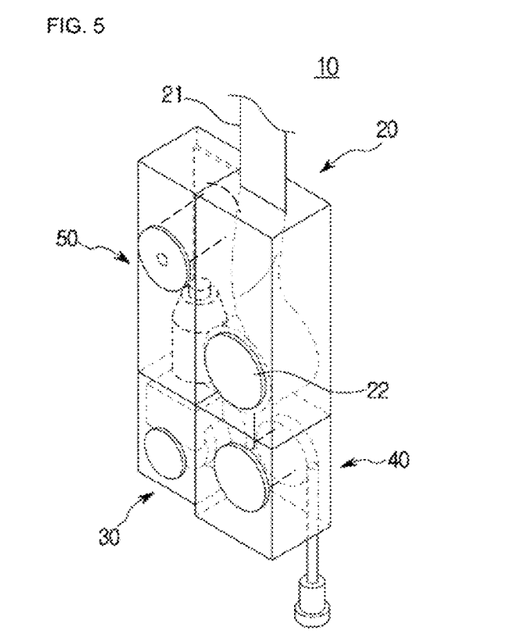

FIG. 2 is an exploded perspective view of the seat belt retractor according to a preferred embodiment of the disclosure, and FIG. 3 is a perspective view illustrating a state in which respective modules shown in FIG. 2 are assembled. FIGS. 4 and 5 are views illustrating states in which the respective modules shown in FIG. 2 are assembled in different methods, respectively.

As shown in FIGS. 2 and 3, the seat belt retractor 10 according to a preferred embodiment of the disclosure may be fabricated by modulizing respective devices such as the spindle 3, the sensor unit 4, the emergency tensioning unit 5, the pretensioning unit 6, etc. described with reference to FIG. 1 according to function blocks, and may be assembled by selectively combining necessary modules.

That is, the seat belt retractor 10 according to a preferred embodiment of the disclosure is fabricated by modulizing respective components applied to the seat belt retractor 10 according to function blocks, and selectively combining the modulized respective components.

For example, the seat belt retractor 10 may be assembled by selectively combining a spindle module 20, a sensor module 30, an emergency tensioning module 40, a pretensioning module 50, and an additional function module.

The spindle module 20 and the sensor module 30 are basic modules that constitute the seat belt retractor 10, and may be fabricated as separate modules and assembled as shown in FIG. 2, or may be provided as one integrated module.

The sensor module 30 may include an acceleration sensor that detects a change in the pull-out acceleration of a webbing 21, or an inclination sensor that detects a change in the inclination of the vehicle.

The spindle module 20 is provided with a spindle 22 having the webbing 21 wound on an outer surface thereof.

The spindle module 20 may operate to wind the webbing 21 when the pull-out acceleration of the webbing 21 or the inclination of the vehicle is changed due to a vehicle collision.

The spindle module 20 may further provide a function of only pulling in the webbing in a predetermined section in order to fix a child seat.

In the following descriptions, a direction in which the webbing 21 is pulled out is set to an upward direction (U), and a direction in which the spindle 22 is mounted is set to a front-rear direction (F, B).

In the present embodiment, a thickness of the seat belt retractor 10, that is, a width in the front-rear direction, is minimized to allow the seat belt retractor 10 to be mounted in a slim seat.

For example, each module in the present embodiment may be fabricated to have the same thickness of about 40 mm to 90 mm, or the other modules may be fabricated to have smaller thicknesses than that of the spindle module 20 with reference to the thickness of the spindle module 20.

In addition, each module is disposed on a side surface of the spindle module 20 with reference to the center of the spindle module 20, that is, on a right or left side, or an upper portion or a lower portion of the spindle module 20.

That is, as shown in FIGS. 2 and 3, the pretensioning module 50 may be disposed on the left side of the spindle module 20, and the sensor module 30 and the emergency tensioning module 40 may be disposed on the right side of the spindle module 20 one on the other.

Of course, the disclosure is not limited thereto.

For example, as shown in FIG. 4, the sensor module 30 and the emergency tensioning module 40 may be disposed on the right side of the spindle module 20, and the pretensioning module 50 may be disposed on the lower portion of the spindle module 20.

Alternatively, as shown in FIG. 5, the pretensioning module 50 may be disposed on the left side or right side of the spindle module 20, and the sensor module 30 and the emergency tensioning module 40 may be disposed on lower portions of the spindle module 20 and the pretensioning module 50.

In the present embodiment, some of the above-described modules may be omitted or an additional function module may further be combined and assembled according to specification of the vehicle, specification of the seat belt retractor 10 if necessary.

In the present embodiment, the modules except for the spindle module 20 are fabricated to have the same thickness as that of the spindle module 20 or have a thickness smaller than that of the spindle module 20, so that the width of the seat belt retractor 10 in the front-rear direction, which is mounted in the backrest of the seat, can be constantly maintained.

Accordingly, by fabricating each module of the seat belt retractor 10 to have a minimum thickness and arranging the other modules on both sides or an upper portion or a lower portion of the spindle module 20 with reference to the center of the spindle module 20, the total volume of the seat belt retractor 10 can be minimized and can be fabricated to be slim.

The respective modules combined as described above may be arranged in parallel or in a perpendicular direction, so that shafts provided in the respective modules face the same direction, for example, the front-rear direction.

Therefore, each module may be configured to transmit or receive power continuously by using a power transmission unit such as a gear, a chain, a belt, etc.

Each module in FIGS. 2 to 5 is schematically illustrated as having a substantially hexahedral shape, but in the disclosure, the seat belt retractor may be fabricated by changing the shapes of the respective modules variously according to functions or configurations thereof, and selectively combining.

Figure 6:
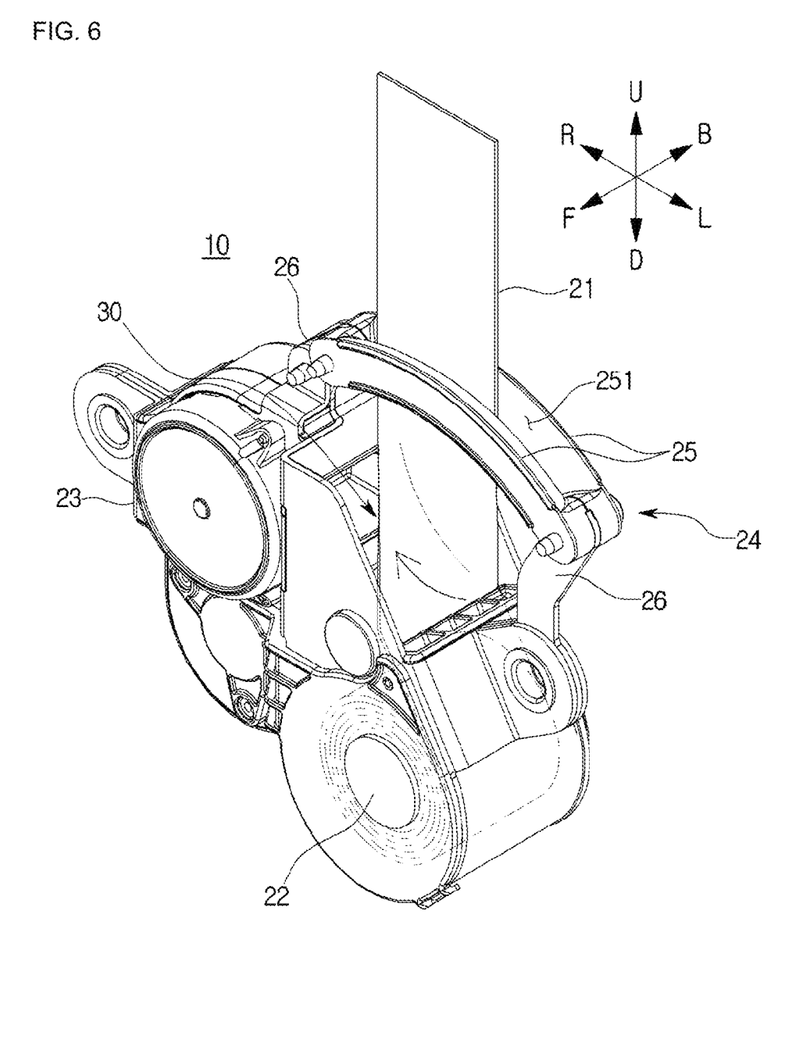
FIG. 6 is a perspective view illustrating a spindle module and a sensor module shown in FIG. 2 in detail.
Figure 7:
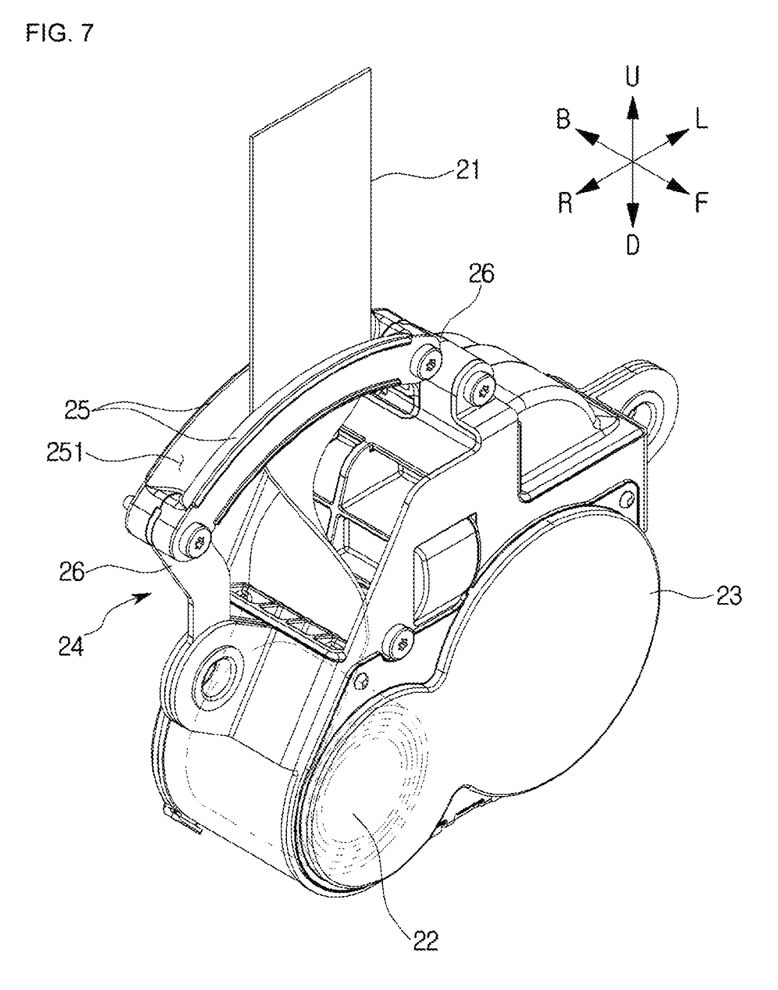
FIG. 7 is a perspective view illustrating the spindle module and the sensor module shown in FIG. 6 from a different angle.

For example, FIG. 6 is a perspective view illustrating the spindle module and the sensor module shown in FIG. 2 in detail, and FIG. 7 is a perspective view illustrating the spindle module and the sensor module shown in FIG. 6 from a different angle.

The spindle module 20 and the sensor module 30 are basic modules that constitute the seat belt retractor 10, and may be integrated into one module and provided as shown in FIGS. 6 and 7, or may be fabricated as separate modules and may be assembled.

In addition, the emergency tensioning module 40 and the pretensioning module 50 may be disposed on one side of the basic module, for example, on the left side.

The respective modules combined as described above are installed so that the shafts provided on the respective modules face the same direction as the installation direction of the spindle 22, and are configured to transmit or receive power through the power transmission unit such as a gear, etc.

The spindle 22 on which the webbing 21 is wound is provided in the spindle module 20.

As shown in FIGS. 6 and 7, the spindle 22 is disposed inside a housing 23 along the front-rear direction, and the webbing 21 is wound on the outer surface of the spindle 22.

A guide portion 24 is provided on an upper portion of the housing 23 to guide the webbing 21 to change the pull-out direction of the webbing 21 to a direction different from the front-rear direction, in which the spindle 22 is installed, for example, a perpendicular direction, that is, a left-right direction.

The guide portion 24 may include one pair of guide frames 25 which are arranged to be spaced apart from each other by a predetermined distance to form a pull-out space 251, through which the webbing is pulled out, and a connection member 26 which connects both ends of the one pair of guide frames 25 to the housing 23, respectively.

The one pair of guide frames 25 may be provided in the shape of a straight bar or a curved bar, or a plate.

Of course, the guide frames 25 may be changed to a rectangular frame shape or a circular or oval frame shape having the pull-out space 251 formed in the center thereof.

One or more connection members 26 may be provided to connect both ends of the guide frame 25 to the housing 23, respectively.

Therefore, the guide portion 24 may be formed to have a cross section of a substantially "1" shape when viewed from the front.

Of course, the shape of the guide portion 24 is not limited thereto, and the cross section of the guide portion may be changed to various shapes such as a substantially 'n' shape or 'A' shape, an arc shape according to various conditions such as an appearance of the housing 23, an installation position of the guide portion 24, and a shape of a periphery thereof.

In addition, the guide portion 24 is disposed perpendicular to the installation direction of the spindle 22.

Accordingly, one end of the webbing 21 is wound on the outer surface of the spindle 22, and the other end of the webbing 21 is pulled out to the outside of the housing 23 and then is pulled out again in the upward direction through the pull-out space 251 between the one pair of guide frames 25.

In this case, the webbing 21 is arranged to face the front-rear direction when being pulled out to the outside of the housing 23, and is rotated in one side direction and is pulled out along the left-right direction when being pulled out through the pull-out space 251 between the one pair of guide frames 25.

As described above, the disclosure can minimize the width in the front-rear direction when the seat belt retractor is mounted in the backrest of the seat, by changing the arrangement direction of the spindle on which the webbing is wound.

In addition, the disclosure can fabricate a slim seat belt retractor by minimizing a width in which the spindle module and the seat belt retractor applying the spindle module are mounted in the seat, by minimizing the width of the spindle module in the front-rear direction.

Hereinafter, a configuration of a seat belt retractor according to another embodiment of the disclosure will be described in detail with reference to FIGS. 8 to 10.

Figure 8:
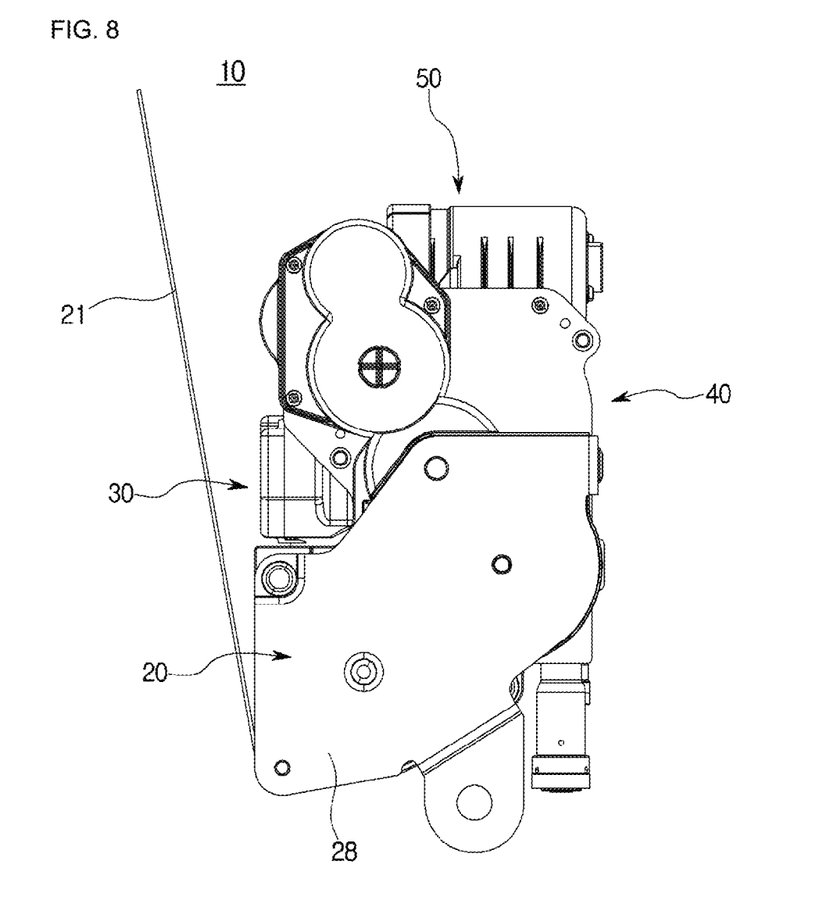
FIG. 8 is a rear view of a seat belt retractor according to another embodiment of the disclosure.
Figure 9:
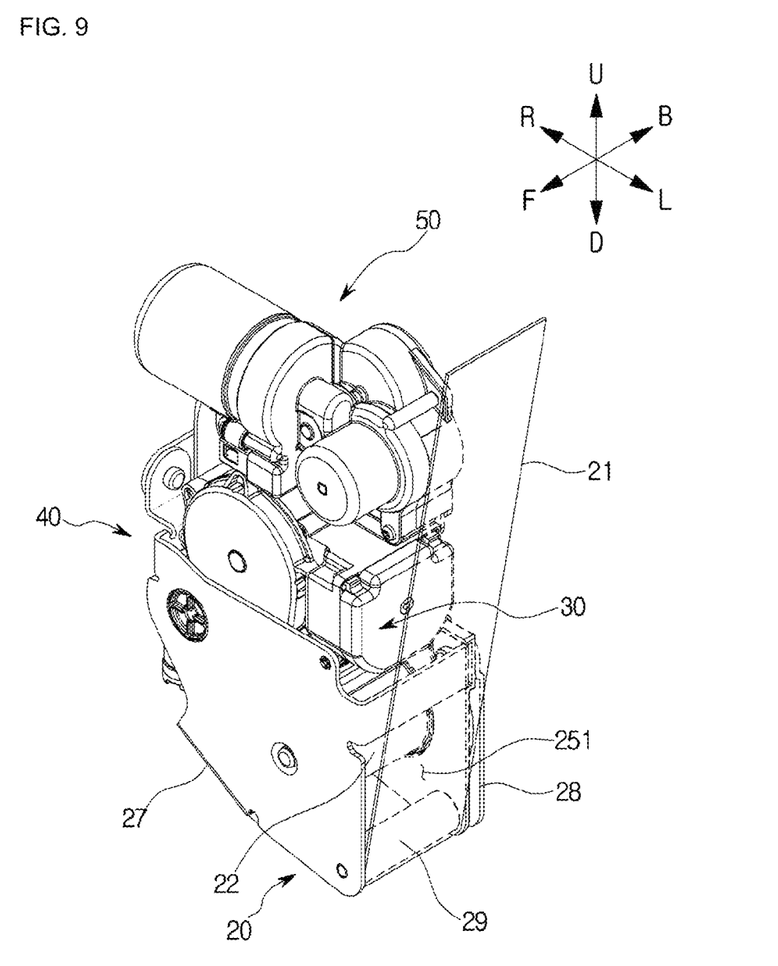
FIG. 9 is a perspective view of the seat belt retractor shown in FIG. 8.
Figure 10:
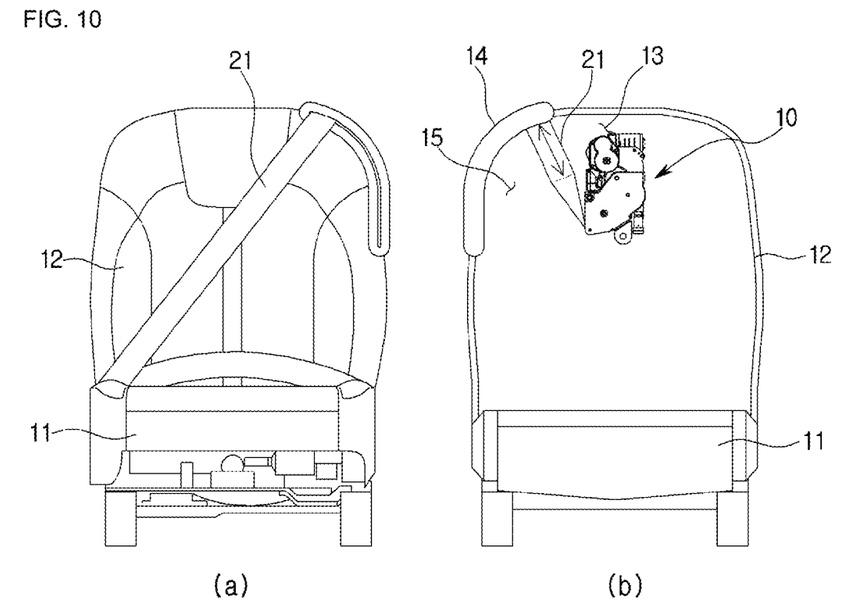
FIG. 10 is a view illustrating a state in which the seat belt retractor shown in FIG. 8 is mounted in a backrest of a seat.

FIG. 8 is a rear view of a seat belt retractor according to another embodiment of the disclosure, FIG. 9 is a perspective view of the seat belt retractor shown in FIG. 8, and FIG. 10 is a view illustrating a state in which the seat belt retractor shown in FIG. 8 is mounted in a backrest of a seat. View (a) of FIG. 10 illustrates the front of the seat, and view (b) of FIG. 10 illustrates the rear of the seat.

As shown in FIGS. 8 to 10, the seat belt retractor 10 according to another embodiment of the disclosure is similar to the seat belt retractor 10 described above with reference to FIGS. 6 and 7 in its configuration. However, the emergency tensioning module 40 and the pretensioning module 50 are coupled to an upper portion of the spindle module 20.

That is, the seat belt retractor 10 according to another embodiment of the disclosure may be fabricated by modulizing the respective components applied to the seat belt retractor 10 according to function blocks, and selectively combining the modulized respective components.

In addition, the spindle module 20 is provided with the spindle 22 having the outer surface on which the webbing 21 is wound.

The spindle module 20 may operate to wind the webbing 21 when the pull-out acceleration of the webbing 21 or the inclination of the vehicle is changed due to a vehicle collision.

The spindle module 20 may further provide a function of only pulling in the webbing 21 in a predetermined section in order to fix a child seat.

In the following descriptions, a direction in which the webbing 21 is pulled out is set to an upward direction (U), and a direction in which the spindle 22 is installed is set to a front-rear direction (F, B).

In the present embodiment, a thickness of the seat belt retractor 10, that is, a width in the front-rear direction, is minimized to allow the seat belt retractor to be mounted in a slim seat.

Each module is disposed on a side surface of the spindle module 20 with reference to the center of the spindle module 20, that is, on a left or right side, an upper portion or a lower portion of the spindle module 20.

For example, as shown in FIGS. 8 and 9, the sensor module 30, the emergency tensioning module 40, the pretensioning module 50 may be arranged on an upper portion of the spindle module 20, respectively.

Herein, the spindle module 20 and the sensor module 30 are basic modules that constitute the seat belt retractor 10, and may be integrated into one module and provided, or may be fabricated as separate modules and may be assembled.

In addition, the emergency tensioning module 40 and the pretensioning module 50 may be arranged on one side of the basic module, for example, on an upper portion.

The respective modules combined as described above are installed in parallel or in a perpendicular direction, so that shafts provided on the respective modules face the same direction as the installation direction of the spindle 22, and are configured to transmit or receive power through a power transmission unit such as a gear, etc.

For example, shafts provided in the emergency tensioning module 40 and the pretensioning module 50 are arranged in parallel with the spindle 22, respectively, and an output shaft of a driving motor provided in the pretensioning module 50 and a shaft provided in the sensor module 30 may be arranged along the left-right direction so as to be perpendicular to the spindle 22.

First and second brackets 27, 28 that are coupled to each other to perform a function of a housing 23 may be coupled to front and rear sides of the spindle module 20.

That is, the first bracket 27 may be disposed on the front side of the spindle module 20, and the second bracket 28 may be disposed on the rear side of the spindle module 28. In addition, coupling members that are coupled to each other may be provided on both sides of the first bracket 27 and the second bracket 28, and an installation member is provided at a lower end of the first and second brackets 27, 28 to be installed on a backrest 12.

Along with this, a pull-out space 251 may be provided on one side of the first and second brackets 27, 28, for example, on a lower end of the left side when viewed on FIG. 8, to allow the webbing 21 to be pulled out therethrough. A guide member 29 may be installed in the pull-out space 251 along the front-rear direction which is the same as the spindle 22.

The guide member 29 functions to guide the webbing 22 to be pulled out in the upward direction. The guide member 29 may be provided as a roller the front and rear ends of which are rotatably shaft-coupled to the first and second brackets 27, 28, respectively, so as to allow the webbing 21 to be wound on or pulled out from the spindle 22 smoothly.

Therefore, the whole width of the seat belt retractor 10 in the front-rear direction may be limited to the width of the first and second brackets 27, 28 in the front-rear direction.

Meanwhile, a mounting space 13 may be provided in the backrest 12 of the seat 11 to have the seat belt retractor 10 mounted therein.

The mounting space 13 may be provided inside the backrest 12, and a webbing guide 14 may be installed at one side of the mounting space 13 to guide the webbing that is pulled out to the outside of the backrest 12 from the spindle module 20.

The mounting space 13 may be provided on an upper portion of the rear side of the backrest 12.

FIG. 10 illustrates that the mounting space 13 is disposed at a center of an upper end of the backrest 12, but the disclosure is not limited thereto. The mounting space 13 may be formed at a position spaced away from an upper end of the backrest 12 downward by a predetermined distance, or may be formed to be biased toward the left side or right side from the center of the backrest 12.

A space in which the webbing 21 is disposed toward the webbing guide 14 may fluidly communicate with one side of the mounting space 13.

When the webbing guide 14 is applied to an upper end of one side of the backrest 12, for example, to the driver seat 11, the webbing guide 14 may be provided to partially cover an upper portion of a left side surface and an edge of a right side of an upper surface of the backrest 12.

Herein, the webbing 21 is pulled out to the outside of the backrest 12 through the mounting space 13 and an arrangement space 15 with both ends of the webbing 21 being wound on the spindle 22 to face the front-rear direction, and the pull-out direction of the webbing 21 may be changed by the webbing guide 14, so that both ends of the webbing 21 face substantially the left-right direction.

That is, the pull-out direction of the webbing 21 is changed so that both ends arranged between the spindle 22 and the webbing guide 14, that is, in the arrangement space 15, in the front-rear direction face the left-right direction.

Along this, a pull-out angle of the webbing 21 may be adjusted according to a position of the webbing guide 14.

Figure 11:
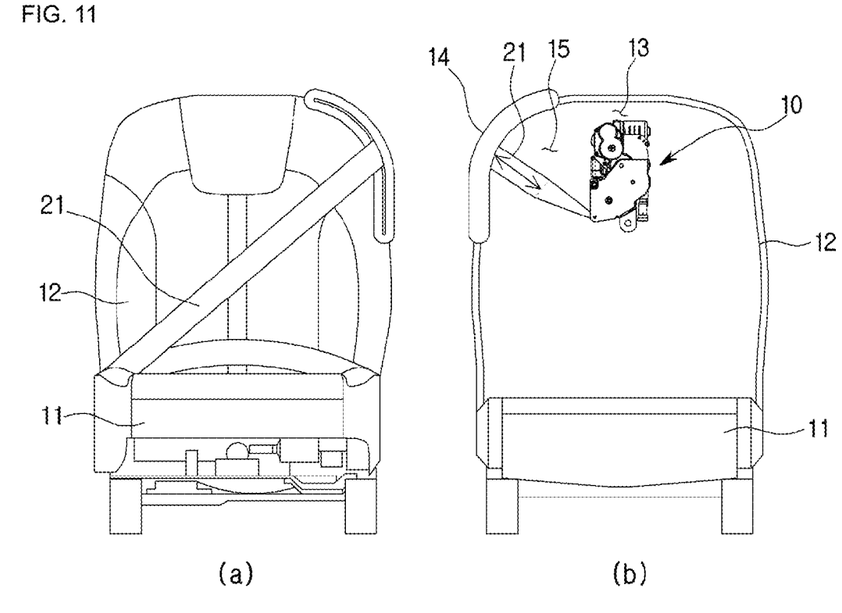
FIGS. 11 and 12 are operational state views illustrating a state in which a pull-out angle of a webbing is adjusted, respectively.
Figure 12:
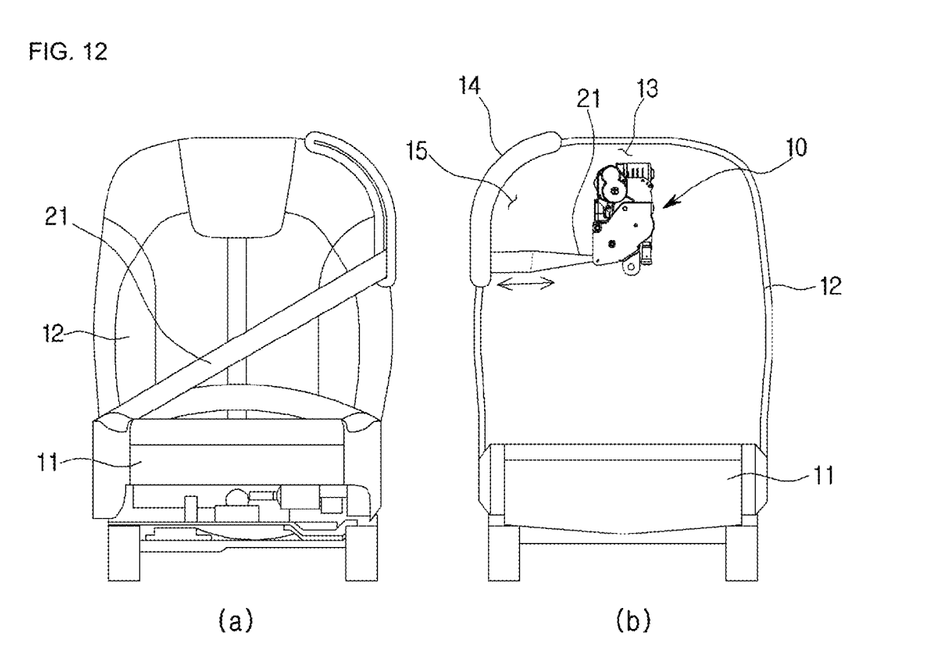

For example, FIGS. 11 and 12 are operational state views illustrating a state in which the pull-out angle of the webbing is adjusted, respectively. Views (a) of FIGS. 11 and 12 illustrate the front of the seat, respectively, and views (b) of FIGS. 11 and 12 illustrate the rear of the seat, respectively.

When an occupant sitting on the driver seat 11 is an adult, the webbing 21 is disposed to face one side of the backrest 12 as shown in FIG. 10, an upper end of the left side, or upward when viewed on FIG. 10. That is, one end of the webbing 21 is wound on the outer surface of the spindle 22, and the other end of the webbing 21 is pulled out to the outside of the seat belt retractor 10 and then is pulled out upwardly toward the webbing guide 14 installed on the backrest 12.

On the other hand, as shown in FIGS. 11 and 12, when the occupant sitting on the seat 11 is a woman, an adolescent, or a child having a smaller body than the adult, the pull-out angle of the webbing 21 may be adjusted, so that the webbing 21 is pulled out from a position shifted down from the upper end of the left side of the backrest 12.

For example, when the occupant adjusts the angle of the backrest by rotating the backrest backward, the webbing may be caught on the occupant's neck or shoulder, causing inconvenience.

In addition, the pull-out angle of the webbing 21 may need to be adjusted according to a physical condition of the occupant, that is, when an adult, an adolescent, a child gets in the vehicle, or according to a body type of the occupant or a purpose of use such as when a child seat is installed.

Therefore, an adjusting member (not shown) may be installed in the webbing guide 14 to be movable within a pre-set range from the upper surface of the backrest 12 to an upper portion of the left side surface, and the webbing 21 may be rotated about the guide member 29 which serves as a rotation axis according to a position of the adjusting member, thereby adjusting the pull-out angle.

According to the disclosure as described above, the webbing wound on the spindle is pulled out through one side of the first and second brackets, and the pull-out angle of the webbing is freely adjusted in the mounting space of the backrest.

Accordingly, the disclosure can enhance stability by adjusting the pull-out direction and the pull-out angle of the webbing according to a physical condition of an occupant or a purpose of use.

In this case, the webbing 21 is arranged to have both ends thereof face the front-rear direction when being pulled out to the outside of the spindle module 20, and the webbing 21 is rotated toward one side when being pulled out through the arrangement space 15 and the webbing guide 14, and is pulled out with both ends being arranged to face the left-right direction.

Through the process described above, the disclosure can minimize the width of the seat belt retractor in the front-rear direction when the seat belt retractor is mounted in the backrest of the seat, by changing the arrangement direction of the spindle on which the webbing is wound.

In addition, the seat belt retractor of the disclosure can be fabricated to be slim by minimizing a width in which the spindle module and the seat belt retractor applying the spindle module are mounted in the seat, by reducing and minimizing the thickness of the spindle module and the width of the webbing.

In addition, the disclosure can freely adjust the pull-out direction and angle of the webbing that is pulled out from the spindle module.

Although the invention made by the inventors of the present application has been specifically described according to the above embodiments, the present disclosure is not limited to the above embodiments, and may be modified variously within a scope of the technical essence of the disclosure.

That is, in the above-described embodiments, it is illustrated that the seat belt retractor is fabricated by selectively combining the spindle module, the sensor module, the emergency tensioning module, and the pretensioning module, but in the disclosure, the seat belt retractor may be fabricated by further selectively combining a module having an additional function in addition to the above-described modules.

In addition, in the above-described embodiments, it is illustrated that the arrangement direction of the spindle and the pull-out direction of the webbing form a right angle, but the disclosure is not limited thereto, and changes may be made so that the arrangement direction of the spindle and the pull-out direction of the webbing form an angle other than the right angle, for example, an acute angle or an obtuse angle, according to a surrounding condition where the spindle is installed.

Although the invention made by the inventors of the present application has been specifically described according to the above embodiments, the present disclosure is not limited to the above embodiments, and may be modified variously within a scope of the technical essence of the disclosure.

The disclosure is applied to a seat belt retractor technology that modulizes respective components applied to the seat belt retractor according to function blocks, fabricates the seat belt retractor by selectively combining modules corresponding to necessary functions, and makes the seat belt retractor slim by rotating a direction in which the spindle on which the webbing is wound is installed and minimizing a width of the seat belt retractor mounted in the backrest of the seat in the front-rear direction.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor mounted in a mounting space formed in a backrest of a seat installed in a vehicle, the seat belt retractor comprising:
   a spindle module including a webbing and a spindle having an outer surface on which the webbing is wound,
   wherein the spindle is disposed in the mounting space along a front-rear direction of the vehicle corresponding to a thickness direction of the backrest such that a rotational axis of the spindle is substantially parallel to the front-rear direction of the vehicle.

2. The seat belt retractor of claim 1, wherein the spindle module further includes first and second brackets disposed on the front and rear sides of the spindle, respectively, and a width of the seat belt retractor in the front-rear direction is limited within a width of the first and second brackets in the front-rear direction.

3. The seat belt retractor of claim 2, wherein a pull-out space where the webbing wound on the spindle is pulled out is formed at one side of the first and second brackets, a guide member is installed in the pull-out space to guide the webbing to be wound on or released from the spindle, and front and rear ends of the guide member are rotatably shaft-coupled to the first and second brackets, respectively.

4. The seat belt retractor of claim 1, wherein the webbing is pulled out in a direction different from an installation direction of the spindle in the backrest.

5. The seat belt retractor of claim 1, wherein the webbing is configured to have a pull-out direction and a pull-out angle which are adjusted between the mounting space and a webbing guide installed in the backrest.

6. The seat belt retractor of claim 5, wherein the webbing guide is arranged to partially cover an upper end of one side of the backrest and an edge of an upper surface of the backrest.

7. The seat belt retractor of claim 5, wherein both ends of the webbing, which are pulled out in the front-rear direction of the vehicle from the spindle module, are rotated to face a left-right direction of the vehicle in an arrangement space formed between the mounting space and the webbing guide, so that the pull-out direction of the webbing is changed.

8. The seat belt retractor of claim 1, further comprising a sensor module that detects an inclination of the vehicle, an emergency tensioning module that reduces slack by winding the webbing upon a vehicle collision, and a pretensioning module that reduces slack by winding the webbing just before the vehicle collision, wherein each module is selectively combined with the spindle module according to functions thereof.

9. The seat belt retractor of claim 8, wherein sensor module, the emergency tensioning module, and the pretensioning module are each disposed on at least one of both sides and upper and lower portions of the spindle module.

10. The seat belt retractor of claim 9, wherein, in the modules combined to be applied to the seat belt retractor, a shaft provided in each module is arranged in parallel or perpendicular to an installation direction of the spindle.

* * * * *